US008498336B2

(12) United States Patent
Tourapis et al.

(10) Patent No.: US 8,498,336 B2
(45) Date of Patent: Jul. 30, 2013

(54) METHOD AND APPARATUS FOR ADAPTIVE WEIGHT SELECTION FOR MOTION COMPENSATED PREDICTION (75) Inventors: Alexandros Tourapis, Burbank, CA (US); Jill MacDonald Boyce, Manalapan, NJ (US); Peng Yin, West Windsor, NJ (US)

(73) Assignee: Thomson Licensing, Boulogne-Billancourt (FR)

( * ) Notice: Subject to any disclaimer, the term of this patent is extended or adjusted under 35 U.S.C. 154(b) by 1188 days.

(21) Appl. No.: 12/087,315

(22) PCT Filed: Jan. 31, 2007

(86) PCT No.: PCT/US2007/002563
§ 371 (c)(1),
(2), (4) Date: Jul. 1, 2008

(87) PCT Pub. No.: WO2007/092215
PCT Pub. Date: Aug. 16, 2007

(65) Prior Publication Data
US 2009/0010330 A1    Jan. 8, 2009

Related U.S. Application Data (60) Provisional application No. 60/764,493, filed on Feb. 2, 2006.

(51) Int. Cl.
*H04N 7/26* (2006.01)
*H04N 7/36* (2006.01)
(52) U.S. Cl.
USPC .............................. 375/240.12; 375/E7.133

(58) Field of Classification Search
USPC .................. 375/240.01–240.29; 348/413
See application file for complete search history.

(56) References Cited

U.S. PATENT DOCUMENTS

| | | | |
|---|---|---|---|
| 6,385,242 | B1 | 5/2002 | Chen |
| 6,591,015 | B1 | 7/2003 | Yasunari et al. |
| 6,792,044 | B2 | 9/2004 | Peng et al. |
| 7,242,716 | B2 | 7/2007 | Koto et al. |
| 2002/0172279 | A1 | 11/2002 | Peng et al. |

(Continued)

FOREIGN PATENT DOCUMENTS

| | | |
|---|---|---|
| CN | 1507751 | 6/2004 |
| JP | 2000 106675 | 4/2000 |

(Continued)

OTHER PUBLICATIONS

Sullivan, G.J.; Wiegand, T.; , "Rate-distortion optimization for video compression," Signal Processing Magazine, IEEE , vol. 15, No. 6, pp. 74-90, Nov. 1998.*

(Continued)

*Primary Examiner* — Gims Philippe
*Assistant Examiner* — Reza Aghevli
(74) *Attorney, Agent, or Firm* — Robert D. Shedd; Guy H. Eriksen (57) ABSTRACT There are provided a method and apparatus for adaptive weight selection for motion compensated prediction. The apparatus includes an encoder for encoding a picture by deriving a set of weighting parameters, selecting at least one weighting parameter in the set based upon a selection criteria, and applying the selected at least one weighting parameter to a reference picture used to encode the picture.

22 Claims, 3 Drawing Sheets

U.S. PATENT DOCUMENTS

| | | | |
|---|---|---|---|
| 2004/0008782 A1 | 1/2004 | Boyce et al. | |
| 2004/0008783 A1 | 1/2004 | Boyce | |
| 2004/0008786 A1 | 1/2004 | Boyce | |
| 2004/0057523 A1* | 3/2004 | Koto et al. | 375/240.26 |
| 2005/0128355 A1 | 6/2005 | Kang et al. | |
| 2005/0281334 A1* | 12/2005 | Walker et al. | 375/240.16 |
| 2006/0018381 A1* | 1/2006 | Luo et al. | 375/240.16 |
| 2006/0198440 A1* | 9/2006 | Yin et al. | 375/240.12 |

FOREIGN PATENT DOCUMENTS

| | | |
|---|---|---|
| WO | WO2004008642 | 1/2004 |
| WO | WO2004008761 | 1/2004 |
| WO | WO2004008762 | 1/2004 |
| WO | WO2004054225 | 6/2004 |
| WO | WO2005004492 | 1/2005 |
| WO | WO 2006/007285 | 1/2006 |

OTHER PUBLICATIONS

Sullivan et al, "Rate-Distortion Optimization for Video Compression", IEEE Signal Processing Magazine, Nov. 1998, pp. 74-90.*

Wiegand, T. et. al., "Draft Errata with Revision-Marked Corrections for H.264/AVC," Joint Video Team (JVT) of ISO/IEC MPEG & ITU-T VCEG (ISO/IEC JTC1/SC29/WG11 and ITU-T SG16 q.6), 9th Meeting: San Diego, CA, Sep. 2-5, 2003, pp. i-xvii and 1-75.

Alattar, A., "Detecting and Compressing Dissolve Regions in Video Sequences with a DVI Multimedia Image Compression Algorithm," ISCAS, 1993 IEEE, pp. 13-16.

Boon-Lock, Y. et. al., "Rapid Scene Analysis on Compressed Video," IEEE Transactions on Circuits and Systems for Video Technology, vol. 5, No. 6, Dec. 1995, pp. 533-544.

Boyce, J., "Adaptive reference picture weighting using reference picture index," Joint Video Team (JVT) of ISO/IEC MPEG & ITU-T VCEG (ISO/IEC JTC1/SC29/WG11 and ITU-T SG16 q.6). 4th Meeting: Klagenfurt, Austria, Jul. 22-26, 2002, JVT-D122, pp. 1-7.

Boyce, J.: "Weighted Prediction in the H.264/MPEG AVC Video Coding Standard," 2004 IEEE. pp. III-789 to III-792.

Flierl, M. et. al., "A Locally Optimal Design Algorithm for Block-Based Multi-Hypothesis Motion-Compensated Prediction." Proceedings of the Data Compression Conference, Snowbird, USA, Apr. 1998, pp. 1-10.

Joyce, R., "Content-Based Temporal Processing of Video," Thesis—Princeton University, Nov. 2002, pp. 1-188.

Koprinska, I. et. al., "Temporal Video Segmentation: A Survey," pp. 1-57.

Shen, Y. et. al.: "Adaptive Weighted Prediction in Video Coding," 2004 IEEE International Conference on Multimedia and Expo (ICME), pp. 427-430.

Suhring, K., "Unified Coding Style for the H.26L Reference Software," Heinrich Hertz Institute, pp. 1-5.

Tourapis, A. et. al.: "H.264/MPEG-4 AVC Reference Software Enhancements," Joint Video Team (JVT) of ISO/IEC MPEG & ITU-T VCEG (ISO/IEC JTC1/SC29/WG11 and ITU-T SG16 Q.6), 14th Meeting in Hong Kong, Jan. 17-21, 2005, XP002444400. International Search Report, dated Aug. 30, 2007.

Kimata, Hideaki et al., "A Study on Weight Parameter Estimation for Weighted Prediction of H.264/AVC", Technical Report of The Institute of Electronics, Information and Communication Engineers, Sep. 2003, OIS2003-64, pp. 51-56. (Partial Translation Provided).

* cited by examiner

METHOD AND APPARATUS FOR ADAPTIVE WEIGHT SELECTION FOR MOTION COMPENSATED PREDICTION

This application claims the benefit, under 35 U.S.C. §365 of International Application PCT/US2007/002563, filed 31 Jan. 2007, which was published in accordance with PCT Article 21(2) on 16 Aug. 2007, in English and which claims the benefit of U.S. provisional patent application No. 60/764,493 filed 2 Feb. 2006.

TECHNICAL FIELD

The present principles relate generally to video encoding and, more particularly, to a method and apparatus for adaptive weight selection for motion compensated prediction.

BACKGROUND

Video compression encoders and/or decoders gain much of their compression efficiency by forming a reference picture prediction of a picture to be encoded, and only encoding the difference between the current picture and the prediction. The more closely correlated the prediction is to the current picture, the fewer the bits needed to compress that picture. This prediction can be generated by using either spatial or temporal samples within previously available pictures or blocks. Temporal prediction is essentially performed through the consideration of motion parameters that may be available within the bitstream and, optionally, weighting/offsetting parameters which are either explicitly encoded or implicitly derived from the bitstream. Weighting and offsetting parameters can be rather useful in the presence of certain transitions such as fades and cross-fades, and could lead to considerably improved performance compared to traditional motion compensated schemes.

Proper selection of weights can greatly impact the video compression efficiency of a system that considers weighted prediction. The International Organization for Standardization/International Electrotechnical Commission (ISO/IEC) Moving Picture Experts Group-4 (MPEG-4) Part 10 Advanced Video Coding (AVC) standard/international Telecommunication Union, Telecommunication Sector (ITU-T) H.264 recommendation (hereinafter the "MPEG-4 AVC standard") provides a weighted prediction tool with two modes, an explicit mode and an implicit mode. In the explicit mode, the encoder may select and properly assign the weights and offsets used in encoding and decoding.

The MPEG-4 AVC standard does not suggest or require any particular method for selecting these weights and offsets. On the other hand, for the implicit mode, weighting parameters are computed based on "temporal" distances between pictures. For determining such distances, each picture/slice is associated with a counter field referred to as the Picture Order Count (POC), which can also be used for display purposes. Implicit mode is only available for B slices, while a rather important differentiation between these two modes is that for B slices for explicit mode the same weights are applied for both single and bi prediction, while implicit weights are applied only for bi prediction.

Several methods have been proposed for weight estimation, which may consider statistical approaches like linear regression, estimating weighting parameters as the ratio between the average value of the pixels in the current picture divided by the average value of the pixels in the reference picture, histogram methods, and weighted parameter estimation in the presence of cross-fades using displaced differences. In any of the above methods, weights are refined by considering the current source picture and the motion predicted non-weighted reference picture. This process is repeated until it converges or satisfies an end criteria/criterion.

In the MPEG-4 AVC standard, multiple reference pictures can be used for inter-prediction, with a reference picture index coded to indicate which of the multiple reference pictures is used. In P slices, only single prediction is used, and the allowable reference pictures are managed in list 0. In B slices, two reference picture lists are considered, list 0 and list 1. In B slices, prediction can be performed using single prediction by considering either list 0 or list 1, or bi-prediction using both list 0 and list 1. When bi-prediction is used, the list 0 and the list 1 predictors are averaged together to form a final predictor. Unlike in previous standards, B pictures may be stored and used as reference pictures when coding other pictures.

The MPEG-4 AVC standard uses tree-structured hierarchical macroblock partitions. Inter-coded 16×16 pixel macroblocks can be broken down into macroblock partitions, of sizes 16×16, 16×8, 8×16, or 8×8. 8×8 macroblock partitions are also known as sub-macroblocks, and may also be broken into sub-macroblock partitions, of sizes 8×4, 4×8, and 4×4. For each macroblock partition, a reference picture index, prediction type (list 0, list 1, bipred), and a motion vector may be independently selected and coded. For each sub-macroblock partition, a motion vector may be independently selected and coded, but the reference picture index and prediction type of the sub-macroblock is used for all of the sub-macroblock partitions.

The MPEG-4 AVC standard does not use a temporal reference in the Video Coding Layer (VCL), but instead uses Picture Order Count (POC) to indicate relative distances between coded pictures. Several methods are provided for coding the picture order count of each slice, including coding of a delta_pic_order_cnt field in the slice header. POC is used for scaling of motion vectors in direct mode, and for weighting factor derivation in weighted prediction (WP) implicit mode.

Weighted prediction is supported in the Main and Extended profiles of the MPEG-4 AVC standard. Use of weighted prediction is indicated in the sequence parameter set for P and SP slices using the weighted_pred_flag field, and for B slices using the weighted_bipred_idc field. There are two WP modes, an explicit mode which is supported in P, SP, and B slices, and an implicit mode which is supported in B slices only.

In WP, the weighting factor used is based on the reference picture index (or indices in the case of bi-prediction) for the current macroblock or macroblock partition. The reference picture indices are either coded in the bitstream or may be derived, e.g., for skipped or direct mode macroblocks. In explicit mode, these parameters are coded in the slice header. In implicit mode, these parameters are derived. The weighting factors and offset parameter values are constrained to allow for 16 bit arithmetic operations in the inter prediction process.

Explicit mode is indicated by weighted_pred_flag equal to 1 in P or SP slices, or by weighted_bipred_idc equal to 1 in B slices. In explicit mode, the WP parameters are coded in the slice header. A multiplicative weighting factor and an additive offset for each color component may be coded for each of the allowable reference pictures in list 0 for P slices and B slices. The number of allowable reference pictures in list 0 is indicated by num_ref_idx_l0_active_minus1, and for list 1 for B slices is indicated by num_ref_idx_l1_active_minus1.

The dynamic range and precision of the weighting factors can be adjusted using the luma_log 2_weight_denom and chroma_log 2_weight_denom fields, which are the binary logarithm of the denominator of the luma and chroma weighting factors, respectively. Higher values of the log weight denominator allow more fine-grained weighting factors but require additional bits for coding the weighting factors and limit the range of the effective scaling. For each allowable reference picture index in list 0, and for B slices also in list 1, flags are coded to indicate whether or not weighting parameters are present in the slice header for that reference picture index, separately for the luma and chroma components. If the weighting parameters are not present in the slice header for a given reference picture index and color component, a default weighting factor equivalent to a scaling factor of 1 and a zero offset are used. The multiplicative weighting factors are coded as luma_weight_l0, luma_weight_l1, chroma_weight_l0, and chroma_weight_l1. The additive offsets are coded as luma_offset_l0, luma_offset_l1, chroma_offset_l0, and chroma_offset_l1.

For fades that are uniformly applied across the entire picture, a single weighting factor and offset are sufficient to efficiently code all macroblocks in a picture that are predicted from the same reference picture. However, for fades that are non-uniformly applied, e.g., for lighting changes or camera flashes, more than one reference picture index can be associated with a particular reference picture store by using memory management control operation (MMCO) commands and/or reference list picture reordering (RPLR). This allows different macroblocks in the same picture to use different weighting factors even when predicted from the same reference picture store.

The same weighting parameters that are used for single prediction are used in combination for bi-prediction. The final inter prediction is formed for the pixels of each macroblock or macroblock partition, based on the prediction type used. For single prediction from list 0, SampleP, which denotes the weighted predictor, is calculated as follows:

$$SampleP=\text{Clip1}(((SampleP0 \cdot W_0 + 2^{LWD-1}) >> LWD) + O_0),$$

and for single prediction from list 1, $$SampleP=\text{Clip1}(((SampleP1 \cdot W_1 + 2^{LWD-1}) >> LWD) + O_1),$$

and for bi-prediction, $$SampleP=\text{Clip1}(((SampleP0 \cdot W_0 + SampleP1 \cdot W_1 + 2^{LWD}) >> (LWD+1)) + (O_0+O_1+1) >> 1)$$

where Clip1( ) is an operator that clips to the range [0, 255], $W_0$ and $O_0$ are the list 0 reference picture weighting factor and offset, and $W_1$ and $O_1$ are the list 1 reference picture weighting factor and offset, and LWD is the log weight denominator rounding factor. SampleP0 and SampleP1 are the list 0 and list 1 initial predictors.

The determination of appropriate explicit WP parameters in an encoder is outside the scope of the MPEG-4 AVC standard.

The Joint Video Team (JVT) JM reference software includes a method of selecting weights and always assigns a value of zero to the offsets. In the JM software method, while coding a picture, the mean values, $M_i$, of the Y, U, and V color components of all pixels in the current picture are calculated, where i is the color component index. In addition, the mean values, $MR_{ij}$, of the Y, U, and V components of each pixel in each of the allowable reference pictures are calculated, where j is the reference picture index. An estimated multiplicative weighting factor, $W_{ij}$, for each color component of each reference picture is computed as the ratio of the mean of the current picture to the mean of the reference picture, scaled by a left shift of the log weight denominator, as follows:

$$W_{ij}=(\text{int})(M_i*(1<<LWD)/MR_{ij})+0.5)$$

After the weighting factor is determined, a scaling of the reference picture by the weighting factor is performed, and the scaled reference picture is stored. The scaled reference picture is rounded to 8-bit precision, so that it may be used in the motion estimation and mode decision processes, which use 8-bit pixel operations.

If implicit WP is used, as was previously described, then weighting factors are not explicitly transmitted in the slice header, but instead are derived based on relative distances between the current picture and the reference pictures. Implicit mode is used only for bi-predictively coded macroblocks and macroblock partitions in B slices, including those using direct mode. The same formula for bi-prediction is used, except that the offset values $O_0$ and $O_1$ are equal to zero, and the weighting factors $W_0$ and $W_1$ are derived using the formulas below.

$$X=(16384+(TD_D>>1))/TD_D$$

$$Z=\text{clip3}(-1024,1023,(TD_B \cdot X+32)>>6)$$

$$W_1=Z>>2 \quad W_0=64-W_1$$

This is a division-free, 16-bit safe operation implementation of the following:

$$W_1=(64*TD_D)/TD_B,$$

where $TD_B$ is temporal difference between the list 1 reference picture and the list 0 reference picture, clipped to the range [−128, 127], and $TD_B$ is difference of the current picture and the list 0 reference picture, clipped to the range [−128, 127]. In this case, since single prediction uses the original references, no additional picture needs to be stored for motion estimation.

Several other methods for estimating the explicit WP parameters were previously proposed, such as methods that consider statistical approaches like linear regression, histogram methods, weighted parameter estimation in the presence of cross-fades using displaced differences, and so forth. Schemes to take motion into consideration have also been proposed. For example, an iterative approach was proposed in which a set of preliminary weights is first computed and then motion vectors are estimated based on the current source picture and the weighted reference picture. Finally, weights are refined by considering the current source picture and the motion predicted non-weighted reference picture, with any of the above methods. This process is repeated until it converges or satisfies a stopping criterion.

Unfortunately, all of the above prior art methods primarily aim to find the best explicit weighting method weights, and never consider which weighting method (implicit versus explicit) should be used, if at all. This can partly be resolved through the consideration of various well known transition detection techniques. Such methods consider various correlation metrics to characterize transitions within a sequence, which could be useful also in determining whether weighting prediction should be used or not. Nevertheless, considering also the presence of two different WP methods, it is also desirable to be able to efficiently select between the two modes, since, potentially either one could provide different benefits.

For simplicity, we write weighted prediction for list 0 prediction as $$SampleP = SampleP0 \cdot w_0 + o_0,$$

we write weighted prediction for list 1 prediction as $$SampleP = SampleP0 \cdot w_0 + O_1,$$

and for bi-prediction as $$SampleP = (SampleP0 \cdot w_0 + SampleP1 \cdot w_1 + o_0 + o_1)/2,$$

where $w_i$ is weighting factor and $o_i$ is weighting offset.

SUMMARY

These and other drawbacks and disadvantages of the prior art are addressed by the present principles, which are directed to a method and apparatus for adaptive weight selection for motion compensated prediction.

According to an aspect of the present principles, there is provided an apparatus. The apparatus includes an encoder for encoding a picture by deriving a set of weighting parameters, selecting at least one weighting parameter in the set based upon a selection criteria, and applying the selected at least one weighting parameter to a reference picture used to encode the picture.

According to another aspect of the present principles, there is provided a video encoding method. The method includes encoding a picture by deriving a set of weighting parameters, selecting at least one weighting parameter in the set based upon a selection criteria, and applying the selected at least one weighting parameter to a reference picture used to encode the picture.

These and other aspects, features and advantages of the present principles will become apparent from the following detailed description of exemplary embodiments, which is to be read in connection with the accompanying drawings.

BRIEF DESCRIPTION OF THE DRAWINGS

The present principles may be better understood in accordance with the following exemplary figures, in which.

DETAILED DESCRIPTION

The present principles are directed to a method and apparatus for adaptive weight selection for motion compensated prediction.

The present description illustrates the present principles. It will thus be appreciated that those skilled in the art will be able to devise various arrangements that, although not explicitly described or shown herein, embody the present principles and are included within its spirit and scope.

All examples and conditional language recited herein are intended for pedagogical purposes to aid the reader in understanding the present principles and the concepts contributed by the inventor(s) to furthering the art, and are to be construed as being without limitation to such specifically recited examples and conditions.

Moreover, all statements herein reciting principles, aspects, and embodiments of the present principles, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that the block diagrams presented herein represent conceptual views of illustrative circuitry embodying the present principles. Similarly, it will be appreciated that any flow charts, flow diagrams, state transition diagrams, pseudocode, and the like represent various processes which may be substantially represented in computer readable media and so executed by a computer or processor, whether or not such computer or processor is explicitly shown.

The functions of the various elements shown in the figures may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor ("DSP") hardware, read-only memory ("ROM") for storing software, random access memory ("RAM"), and non-volatile storage.

Other hardware, conventional and/or custom, may also be included. Similarly, any switches shown in the figures are conceptual only. Their function may be carried out through the operation of program logic, through dedicated logic, through the interaction of program control and dedicated logic, or even manually, the particular technique being selectable by the implementer as more specifically understood from the context.

In the claims hereof, any element expressed as a means for performing a specified function is intended to encompass any way of performing that function including, for example, a) a combination of circuit elements that performs that function or b) software in any form, including, therefore, firmware, microcode or the like, combined with appropriate circuitry for executing that software to perform the function. The present principles as defined by such claims reside in the fact that the functionalities provided by the various recited means are combined and brought together in the manner which the claims call for. It is thus regarded that any means that can provide those functionalities are equivalent to those shown herein.

Reference in the specification to "one embodiment" or "an embodiment" of the present principles means that a particular feature, structure, characteristic, and so forth described in connection with the embodiment is included in at least one embodiment of the present principles. Thus, the appearances of the phrase "in one embodiment" or "in an embodiment" appearing in various places throughout the specification are not necessarily all referring to the same embodiment.

Figure 1:
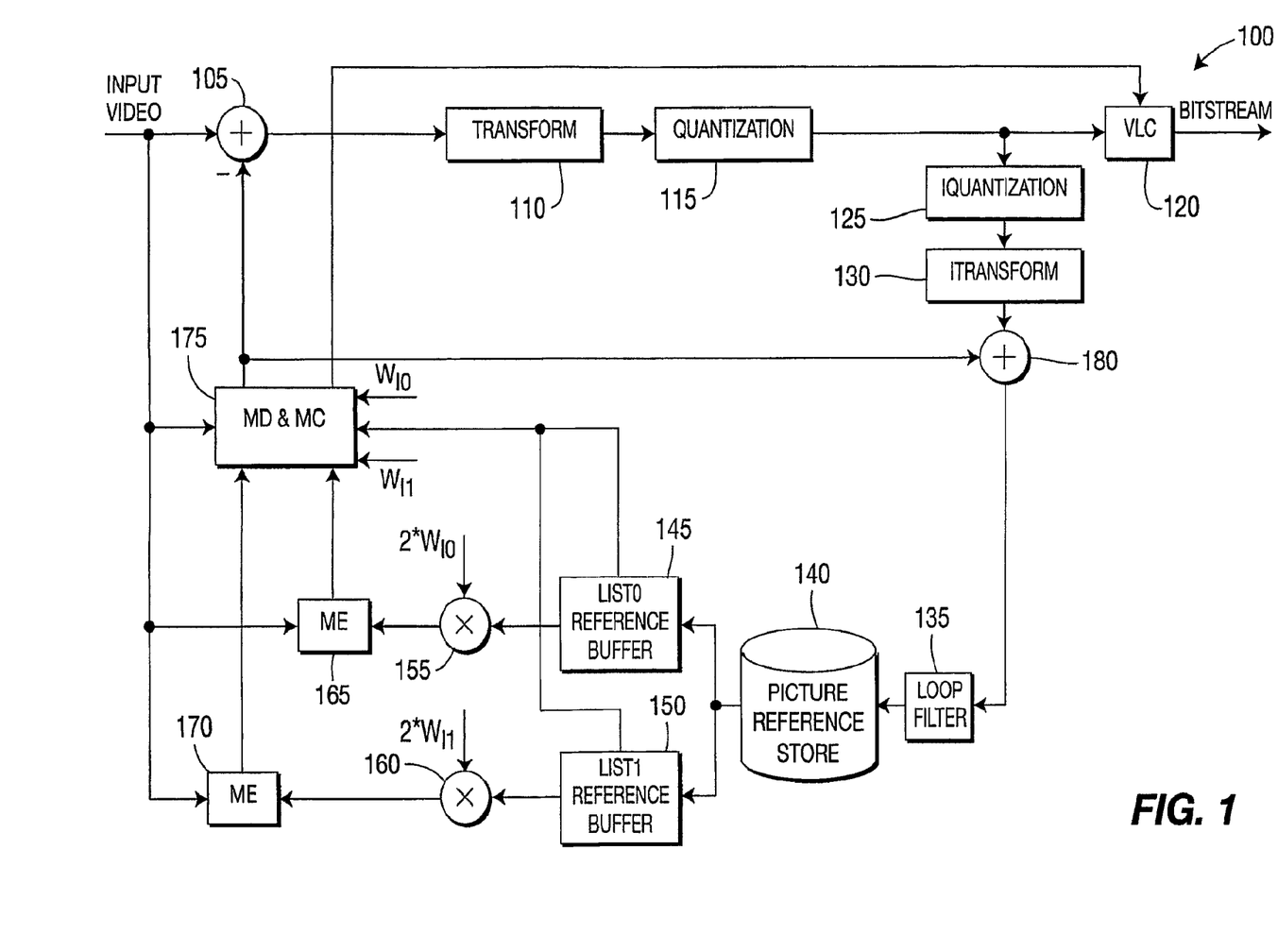
FIG. 1 shows a diagram for an exemplary video encoder, which incorporates weights estimation, to which the present principles may be applied, in accordance with an embodiment of the present principles.

Turning to FIG. 1, an exemplary video encoder which incorporates weights estimation is indicated generally by the reference numeral 100.

A non-inverting input of a combiner 105, a first input of a Mode Decision (MD) & Motion Compensation (MC) 175, a first input of a motion estimator (ME) 165, and a first input of a motion estimator 170 are available as inputs to the video encoder. An output of the combiner 105 is connected in signal communication with an input of a transformer 110. An output of the transformer 110 is connected in signal communication with an input of a quantizer 115. An output of the quantizer 115 is connected in signal communication with an input of a variable length coder (VLC) 120. An output of the VLC 120 is available as an output of the video encoder 100.

The output of the quantizer 115 is also connected in signal communication with an input of an inverse quantizer 125. An output of the inverse quantizer 125 is connected in signal communication with an input of an inverse transformer 130. An output of the inverse transformer 130 is connected in signal communication with a first non-inverting input of a combiner 180. An output of the combiner 180 is connected in signal communication with an input of a loop filter 135. An output of the loop filter 135 is connected in signal communication with an input of a picture reference store 140. An output of the reference picture store 140 is connected in signal communication with an input of a List0 reference buffer 145 and with an input of a List1 reference buffer 150. A first output of the List0 reference buffer 145 is connected in signal communication with a first input of multiplier 155. A first output of the List1 reference buffer 150 is connected in signal communication with a first input of a multiplier 160. A second output of the List0 reference buffer 145 and a second output of the List1 reference buffer 150 are connected in signal communication with a second input of the MD&MC 175. An output of the multiplier 155 is connected in signal communication with a second input of the motion estimator 165. An output of the multiplier 160 is connected in signal communication with a second input of the motion estimator 170. A first output of the MD&MC 175 is connected in signal communication with an inverting input of the combiner 105. A second output of the MD&MC 175 is connected in signal communication with a second non-inverting input of the combiner 180.

A method and apparatus are provided that allow for determining the most appropriate weighting method(s) for encoding a current picture. Furthermore, in accordance with an embodiment of the present principles, the determination of the explicit weighting parameters can be improved by considering multiple weight estimation methods. In accordance with an embodiment of the present principles, different weighting factors are initially estimated using various methods. These weights, which could include normal, implicit, and multiple explicit weights, are then evaluated by considering simple criteria or methods, such as correlation or distortion computation, and the most appropriate weight and weighting method(s) according to such criteria is selected for encoding the current picture/slice.

Advantageously, an embodiment of the present principles allows for the efficient selection between explicit and implicit modes, since, potentially, either one could provide different benefits. For example the implicit mode may provide better performance in the presence of only local brightness transformations, or during linear fades, while explicit mode may be more useful during cross-fades. Furthermore, the implicit mode may itself be useful for improving coding efficiency of non-fading frames considering that single prediction does not use weights, while bi-prediction allows for a more efficient exploiting of the higher correlation that may exist with references closer in time.

It is to be noted that some prior art methods exists that allow for an initial estimate about the transition within the sequence, which could also assist in the determination of the weighting method that is to be used, if necessary, for weighted prediction. Nevertheless, as previously described, weighted prediction (WP), and in particular the use of implicit WP may prove quite useful and beneficial even during periods in which no fades are present. Furthermore, although various algorithms are known for estimating the explicit weighting parameters, we contend that different computation methods could be more beneficial or accurate for certain types of transitions. Therefore, in accordance with the present principles, various embodiments are provided that not only improve the weight parameter selection, but also make a better decision with regard to the WP method that is to be used. Although one approach that may be used would be to encode a picture using all possible WP combinations (weighting methods, weights, and so forth), and then select the best one according to a predetermined criterion (i.e., using Rate Distortion Optimal decision of the form $J=D+\lambda*R$ where D is distortion, $\lambda$ is a Lagrangian parameter and R the bits used to encode the current picture), such methods are too computationally expensive, and not as practical especially for a real time implementation.

In general, the word "pictures" as used herein refers to either field or frame pictures according to the picture structure decision. Initially a set of picture correlation metrics needs to be computed according to the slice type or prediction method that is used. In particular, for single inter-prediction (P slices), we may consider three possible cases for the computation of such picture correlation metrics. This process is done for all available references within list0 that are used for Motion Compensation. For reference i we may consider the following cases.

Case 1:

$$w_{0,i} = \frac{\text{mean}(F_{cur})}{\text{mean}(F_{ref,i})}, o_{0,i} = 0$$

where $w_{0,i}$ is the weight for this reference, and $o_{0,i}$ is the corresponding offset. $F_{cur}$ corresponds to the current picture, and $F_{ref,i}$ is the reference with index i. The mean essentially computes the average of all pixels within $F_{cur}$. Note that computation could also be based on DC images, or even sub-sampled images in order to reduce complexity if needed. Based on these weighting parameters a distortion metric compared to the current picture is also computed which is referred to herein as sum_diff_wf$_{0,i}$. This distortion metric will be described further later. It is apparent that this case is used in order to consider multiplicative transitions.

Case 2:

$$w_{0,i}=1, o_{0,i}=\text{mean}(F_{cur})-\text{mean}(F_{ref,i})$$

Similar to Case 1, based on these weighting parameters, a distortion metric compared to the current picture is also computed which is referred to herein as sum_diff_wo$_{0,i}$. This case is considered for additive transitions.

Case 3:

We also consider weighting parameters $w_{0,i}=1$ and $o_{0,i}=0$, which perform no weighting operation to our prediction samples. The distortion metric compared to the current picture is not sum_diff_nowp$_{0,i}$.

For bi-prediction (B slices), a few additional cases and sub-cases are considered. A key difference from single prediction weights is that weighting parameters now have to be computed for both list0 and list1 references, while the joint effect of weighting both references and the availability of implicit weights should be considered. More specifically, we first consider the following sub-cases where weighting parameters for reference i in list x are computed as follows.

Sub-Case 1:

$$w_{x,i} = \frac{\text{mean}(F_{cur})}{\text{mean}(F_{ref,x,i})}, o_{x,i} = 0$$

where $w_{x,i}$ is the weight for this reference, and $o_{x,i}$ is the corresponding offset. Based on these weighting parameters, a distortion metric compared to the current picture is also computed which is referred to herein as sum_diff_wf$_{x,i}$. This distortion metric will be further discussed herein after. This case is used to consider multiplicative transitions.

Sub-Case 2:

$$w_{x,i}=1, o_{x,i}=\text{mean}(F_{cur})-\text{mean}(F_{ref,x,i})$$

Similar to Case 1, these weighting parameters are used to compute a distortion metric for each reference compared to the current picture, which is referred to herein as sum_diff_wo$_{x,i}$. This case is considered for additive transitions.

Sub-Case 3:

We also consider weighting parameters $w_{x,i}=1$ and $o_{x,i}=0$, which perform no weighting operation to our prediction samples. The distortion metric compared to the current picture is not sum_diff_nowp$_{x,i}$.

For these sub-cases, weighting parameter selection for each reference in each list is made similar to the single prediction case, without jointly considering the impact of other references. The selected weighting parameters from this decision will then be considered in a second step which considers joint weight optimization.

In particular for bi-prediction we now have the following cases to consider.

Case 1:

$w_{x,i}$ and $o_{x,i}$ for both lists are pre-selected from sub-case 1 through sub-case 3.

Case 2:

Case 2 involves the consideration of joint correlation through computation of $w_0$ and $w_1$ as follows:

$$w_0 = \frac{2\beta}{\beta+1} \text{ and } w_1 = \frac{2}{\beta+1},$$

where $$\beta = \frac{\sum(\text{Fref\_l1}[x,y] - \text{Fcur}[x,y])}{\sum(\text{Fcur}[x,y] - \text{Fref\_l0}[x,y])}$$

If $\beta \leq 0$, then the distance based weight estimation method is used (implicit weights). Weighting offsets are set to 0.

Case 3:

Weights are computed implicitly.

Case 4:

No weights are considered.

After creating the above set of weighted prediction candidates, a preliminary selection is performed with regards to WP parameters. More specifically, each one of the possible weighting candidates described above (no weighting, Implicit weighting, and explicit weighting methods) results in one factor/offset couple for single prediction and two for bi-predictions.

For single prediction and for sub-case consideration within bi-prediction, the distortion based on difference of histograms is used.

$$wF_{ref} = w * F_{ref}[x,y] + o$$

$$\text{distortion} = \sum_{i=0}^{nb\_bins-1} |YHisto_{F_{cur}}[i] - YHisto_{wF_{ref}}[i]|$$

The above distortion tends to be quite robust in the presence of motion and that is why it was selected for our computation. Note also that this computation could be based again on DC images, or sub-sampled images (e.g., by a factor of N and/or M horizontally and vertically, respectively) in order to reduce complexity.

Figure 2:
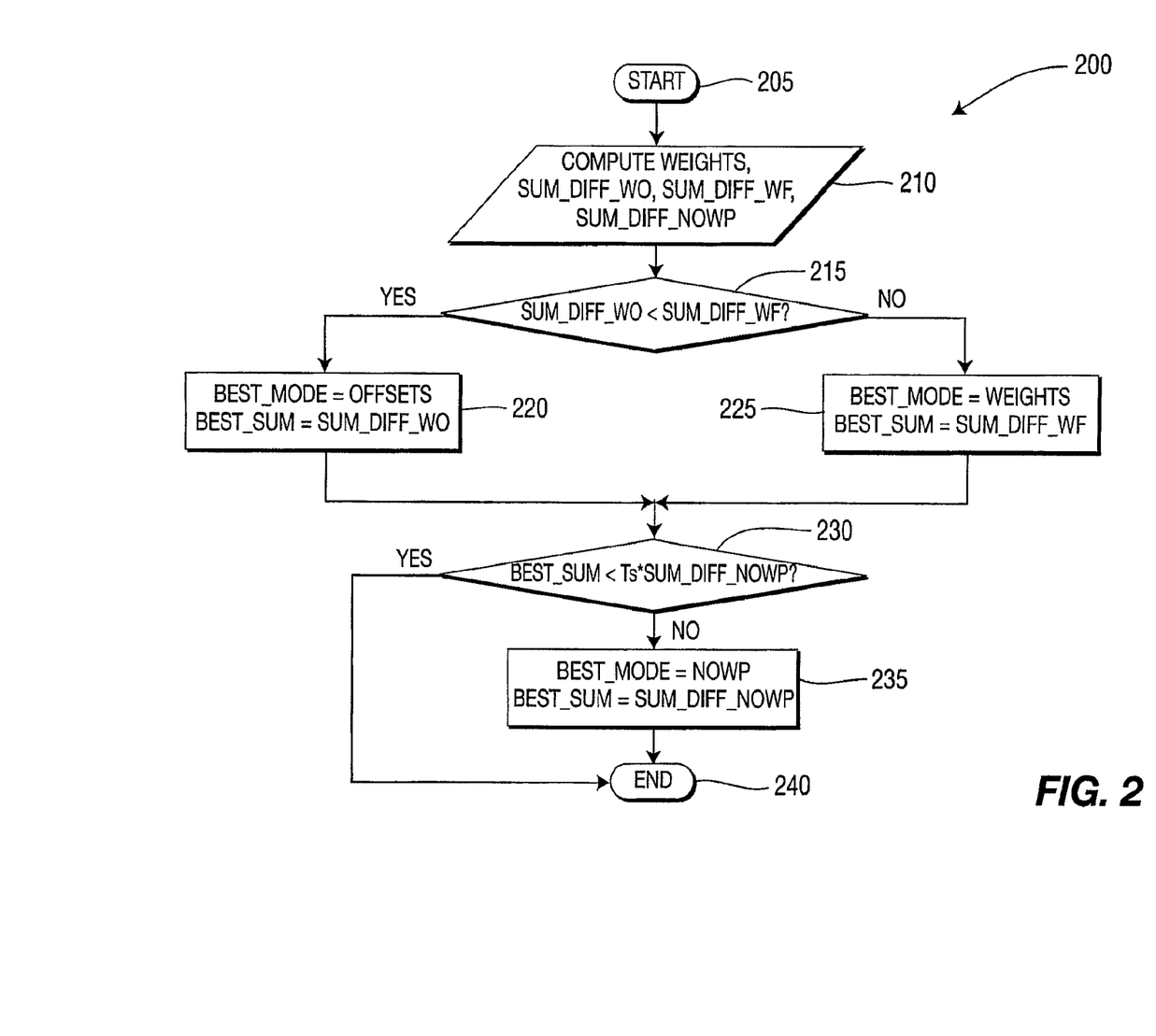
FIG. 2 shows a diagram for an exemplary method for selecting the best weighted prediction method for single prediction, in accordance with an embodiment of the present principles.

The histogram distortions can then be used to determine which method is most likely superior in terms of single prediction. However, it is to be appreciated that the present principles are not limited to solely the use of histogram distortions and, thus, other distortion metrics may also be used in accordance with the principles. For example, one other such distortion metric includes, but is not limited to, absolute difference. Selection can also be based on the successful detection of the current transition, while due to the consideration that the use of no WP might be more appropriate at times, a different priority for such distortion is considered when comparing to the weighted distortions. More specifically, adaptive selection for single prediction can be described in the following pseudo code (as well as the method 200 of FIG. 2 below):

```
// compare weights first (offset only method versus weight only),
// then select between no weights and weights
if (sum_diff_wf <= sum_diff_wo)
{
    min_sum_diff = sum_diff_wf;
    min_log_weight_denom = log_weight_denom;
    min_weight_factor = weight_factor;
    min_weight_offset = 0;
}
else
{
    min_sum_diff = sum_diff_wo;
    min_log_weight_denom = default_log_weight_denom;
    min_weight_factor = default_weight;
    min_weight_offset = weight_offset;
}
double delta_wp = 0.05;
if (the sequence is a fade)
    cond = sum_diff_nowp <
(int)((0.75+delta_wp*ref_ind)*(double)min_sum_diff+0.5);
else
    cond = (int)(0.9*(double)sum_diff_nowp) < min_sum_diff;
if ( cond)
{
    min_sum_diff = sum_diff_nowp;
    min_log_weight_denom = default_log_weight_denom;
    min_weight_factor = default_weight;
    min_weight_offset = 0;
}
else
{
    log_weight_denom = min_log_weight_denom;
    weight_factor = min_weight_factor;
    weight_offset = min_weight_offset;
}
```

Similarly, for bi-prediction, the following distortion is computed for each possible prediction couple:

for single prediction $$\text{distortion}=\Sigma|DC_{Fcurr}[x,y]-(w_{x,i}DC_{Fref\_i,x}[x,y]+o_{x,i})|;$$

and for bi-prediction:

$$\text{distortion} = \sum \min \left( \left| DC_{Fcurr}[x, y] - \frac{\begin{pmatrix} w_0 \times DC_{Fref\_l0}[x, y] + o_0 + \\ w_1 \times DC_{Fref\_l1}[x, y] + o_1 \end{pmatrix}}{2} \right|, \right.$$
$$|DC_{Fcurr}[x, y] - (w_{0,0} \times DC_{Fref\_l0}[x, y] + o_{0,0})|,$$
$$\left. |DC_{Fcurr}[x, y] - (w_{1,0} \times DC_{Fref\_l1}[x, y] + o_{1,0})| \right)$$

Based on this new distortion, we may now determine the weighted prediction method that is to be used as follows:

```
If the sequence is not a fade or cross-fade,
{
    For single prediction,
        No weighting (w=1, o=0)
    For bi-prediction,
        If (distortion imp ≦ a * distortion nowp)
            Implicit weighting
        Else
            No weighting
}
Else
{
    For single prediction,
    If (distortion exp2 ≦ b * min(distortion nowp, distortion exp1))
        Explicit weighting method 2
        Else if (distortion exp1 ≦ distortion nowp)
    Explicit weighting method 1
    Else
        No weighting
    For bi-prediction,
        If (distortion case2 < c * min(distortion NoW, distortion Imp, distortion case1))
            Explicit weighting method case 2
        Else if (distortion case1 ≦ d * min(distortion NoW, distortion Imp))
            Explicit weighting method case 1
        Else if (distortion Imp ≦ e * distortion NoW)
            Implicit weighting
        Else
            No weighting
}
```

In the preceding pseudo code, a, b, c, d, and e are weighting coefficients according to the priority that we may wish to assign for each weighting method. More specifically, in one embodiment of the present invention used for testing, we have used a=0.75, b=c=0.8, d=e=0.95, although other values could also be used. For example, if no transition detection algorithm is used, these values could be altered to provide even higher priority to the normal, or even implicit modes without penalizing performance significantly. This approach is described below with respect to FIG. 3.

It should be noted that method 2 weights are considered during motion estimation from combined references and the final mode decision and encoding. Motion estimation from normal references may be performed using the best of the three other methods.

It is to be appreciated that we may also use any of the previously developed weighted prediction estimation methods (e.g., histogram approach, iterative schemes, and so forth) to estimate additional weighting prediction candidates, therefore increasing the number of potential cases that could be considered for such purpose.

Turning to FIG. 2, an exemplary method for selecting the best weighted prediction method for single prediction is indicated generally by the reference numeral 200. The method 200 includes a start block 205 that passes control to a function block 210. The function block 210 computes the weights, sum_diff_wo, sum_diff_wf, and sum_diff_nowp, and passes control to a decision block 215. The decision block 215 determines whether or not sum_diff_wo is less than sum_diff_wf. If so, then control is passed to a function block 220. Otherwise, control is passed to a function block 225.

The function block 220 sets the best mode to offsets, sets the best_sum to sum_diff_wo, and passes control to a decision block 230.

The function block 225 sets the best_mode to weights, sets the best_sum to sum_diff_wf, and passes control to a decision block 230.

The decision block 230 determines whether or not best_sum is less than Ts*sum_diff_nowp. If so, then control is passed to 240. Otherwise, control is passed to 235.

The function block 235 sets the best_mode to nowp, sets the best_sum to sum_diff_nowp, and passes control to an end block 240.

Figure 3:
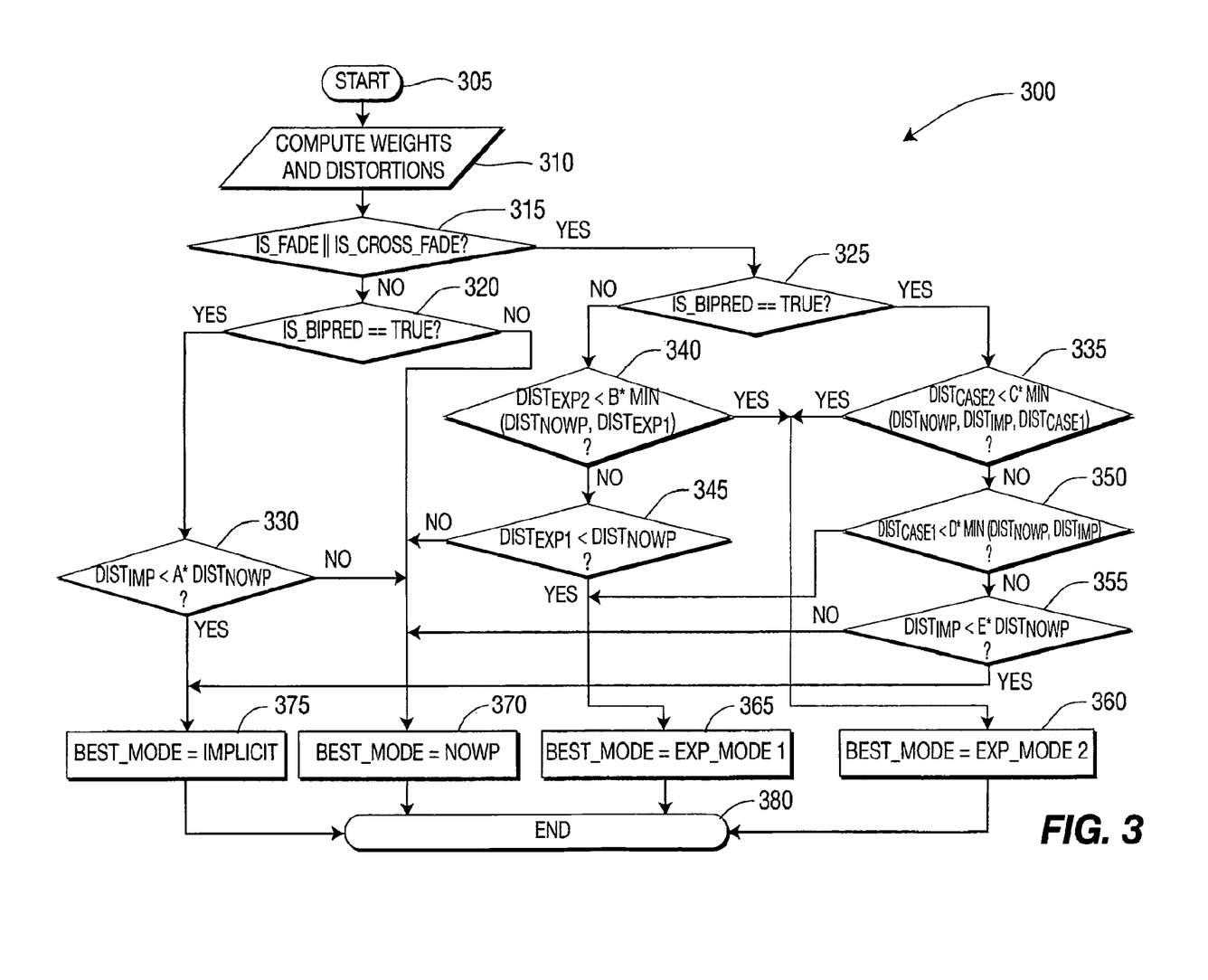
FIG. 3 shows a diagram for an exemplary method for selecting the best weighted prediction method for single prediction and bi-prediction, in accordance with an embodiment of the present principles.

Turning to FIG. 3, an exemplary method for selecting the best weighted prediction method for single prediction and bi-prediction is indicated generally by the reference numeral 300.

The method 300 includes a start block 305 that passes control to a function block 310. The function block 310 computes the weights and distortions, and passes control to a decision block 315. The decision block 315 determines whether or not the scene transition is fade or cross_fade. If so, then control is passed to a function block 325. Otherwise, control is passed to a decision block 320.

The decision block 325 determines whether or not bi-prediction is to be used. If so, then control is passed to a function block 335. Otherwise, control is passed to a decision block 340.

The decision block 335 determines whether or not $dist_{case2} < c \ast min(dist_{nowp}, dist_{imp}, dist_{case1})$. If so, then control is passed to a function block 360. Otherwise, control is passed to a decision block 350.

The function block 360 sets the best_mode to exp_mode2, and passes control to an end block 380.

The decision block 350 determines whether or not $dist_{case1} < d \ast min(dist_{nowp}, dist_{imp})$. If so, then control is passed to a function block 365. Otherwise, control is passed to a decision block 355.

The function block 365 sets the best_mode to exp_mode1, and passes control to the end block 380.

The decision block 355 determines whether or not $dist_{imp} < e \ast dist_{nowp}$. If so, the control is passed to a function block 375. Otherwise, control is passed to a function block 370.

The function block 375 sets the best_mode to implicit, and passes control to the end block 380.

The function block 370 sets the best_mode to nowp, and passes control to the end block 380.

The decision block 320 determines whether or not bi-prediction is to be used. If so, then control is passed to a decision block 330. Otherwise, control is passed to the function block 370.

The decision block 330 determines whether or not $dist_{imp} < a \ast dist_{nowp}$. If so, then control is passed to the function block 375. Otherwise, control is passed to the function block 370.

The decision block 340 determines whether or not $dist_{exp2} < b \ast min(dist_{nowp}, dist_{exp1})$. If so, then control is passed to the function block 360. Otherwise, control is passed to the decision block 345.

The decision block 345 determines whether or not $dist_{exp1} < dist_{nowp}$. If so, then control is passed to the function block 365. Otherwise, control is passed to the function block 370.

A description will now be given of some of the many attendant advantages/features of the present invention, some of which have been mentioned above. For example, one advantage/feature is an apparatus that includes an encoder for encoding a picture by deriving a set of weighting parameters, selecting at least one weighting parameter in the set based upon a selection criteria, and applying the selected at least one weighting parameter to a reference picture used to encode the picture. Another advantage/feature is the apparatus having the encoder as described above, wherein the encoder selects the at least one weighting parameter in the set based upon a full encoding of the picture with each of the weighting parameters in the set and using rate distortion optimization. Yet another advantage/feature is the apparatus having the encoder that uses the rate distortion optimization as described above, wherein the rate distortion optimization is performed using Lagrangian multipliers.

Moreover, another advantage/feature is the apparatus having the encoder as described above, wherein the encoder selects the at least one weighting parameter based upon a computation of a distortion metric. Further, another advantage/feature is the apparatus having the encoder that selects the at least one weighting parameter based upon the computation of the distortion metric as described above, wherein the distortion metric is computed as an absolute picture difference between the picture and a weighted reference picture. Also, another advantage/feature is the apparatus having the encoder that selects the at least one weighting parameter based upon the computation of the distortion metric as described above, wherein the distortion metric is computed as a difference between histograms of the picture and a weighted reference picture. Additionally, another advantage/feature is the apparatus having the encoder that selects the at least one weighting parameter based upon the computation of the distortion metric as described above, wherein the encoder uses at least one of histogram methods, picture mean averages, linear regression, displaced differences, and iterative methods to estimate explicit weighting parameters for the picture.

Yet another advantage/feature is the apparatus having the encoder as described above, wherein the encoder also selects an optimal weighting method to encode the picture based on distortion characterization, the optimal weighting method selected from among a non-weighted prediction method, an explicit weighted prediction method, and an implicit weighted prediction method, each included in the set of weighting parameters. Further, another advantage/feature is the apparatus having the encoder that also selects the optimal weighting method as described above, wherein the distortion characterization involves bi-prediction distortion computed based on both list 0 and list 1 reference pictures. Also, another advantage/feature is the apparatus having the encoder that also selects the optimal weighting method as described above, wherein the encoder selects the optimal weighting method to encode the picture using at least one transition detection method.

These and other features and advantages of the present principles may be readily ascertained by one of ordinary skill in the pertinent art based on the teachings herein. It is to be understood that the teachings of the present principles may be implemented in various forms of hardware, software, firmware, special purpose processors, or combinations thereof.

Most preferably, the teachings of the present principles are implemented as a combination of hardware and software. Moreover, the software may be implemented as an application program tangibly embodied on a program storage unit. The application program may be uploaded to, and executed by, a machine comprising any suitable architecture. Preferably, the machine is implemented on a computer platform having hardware such as one or more central processing units ("CPU"), a random access memory ("RAM"), and input/output ("I/O") interfaces. The computer platform may also include an operating system and microinstruction code. The various processes and functions described herein may be either part of the microinstruction code or part of the application program, or any combination thereof, which may be executed by a CPU. In addition, various other peripheral units may be connected to the computer platform such as an additional data storage unit and a printing unit.

It is to be further understood that, because some of the constituent system components and methods depicted in the accompanying drawings are preferably implemented in software, the actual connections between the system components or the process function blocks may differ depending upon the manner in which the present principles are programmed. Given the teachings herein, one of ordinary skill in the pertinent art will be able to contemplate these and similar implementations or configurations of the present principles.

Although the illustrative embodiments have been described herein with reference to the accompanying drawings, it is to be understood that the present principles is not limited to those precise embodiments, and that various changes and modifications may be effected therein by one of ordinary skill in the pertinent art without departing from the scope or spirit of the present principles. All such changes and modifications are intended to be included within the scope of the present principles as set forth in the appended claims.

The invention claimed is:

1. An apparatus, comprising:
an encoder for encoding a single prediction picture by deriving a set of weighting parameters, selecting a single weighting parameter in the set based upon a selection criteria, and applying the selected single weighting parameter to a single reference picture used to encode the single prediction picture,
wherein said encoder selects the single weighting parameter in the set based upon a full encoding of the picture with each of the weighting parameters in the set and using rate distortion optimization, and
wherein the weighting parameters in the set correspond to different weighting methods, and only one weighting parameter is derived for each of the different weighting methods.

2. The apparatus of claim 1, wherein the rate distortion optimization is performed using Lagrangian multipliers.

3. The apparatus of claim 1, wherein said encoder selects the single weighting parameter based upon a computation of a distortion metric.

4. The apparatus of claim 3, wherein the distortion metric is computed as an absolute picture difference between the single prediction picture and a weighted reference picture.

5. The apparatus of claim 3, wherein the distortion metric is computed as a difference between histograms of the single prediction picture and a weighted reference picture.

6. The apparatus of claim 3, wherein said encoder uses at least one of histogram methods, picture mean averages, linear regression, displaced differences, and iterative methods to estimate explicit weighting parameters for the single prediction picture.

7. The apparatus of claim 1, wherein said encoder also selects an optimal weighting method from among the different weighting methods to encode the single prediction picture based on distortion characterization, the optimal weighting method selected from among a non-weighted prediction method, an explicit weighted prediction method, and an implicit weighted prediction method, each included in the set of weighting parameters, and wherein the single weighting parameter is explicitly coded in a resultant bitstream in the explicit weighted prediction method and is implicitly derivable from the resultant bitstream in the implicit weighted prediction method.

8. The apparatus of claim 7, wherein said encoder selects the optimal weighting method to encode the single prediction picture using at least one transition detection method.

9. A video encoding method, comprising:
 encoding a single prediction picture by deriving a set of weighting parameters;
 selecting a single weighting parameter in the set based upon a selection criteria; and
 applying the selected single weighting parameter to a single reference picture used to encode the single prediction picture,
 wherein said encoding step selects the single weighting parameter in the set based upon a full encoding of the single prediction picture with each of the weighting parameters in the set and using rate distortion optimization, and P1 wherein the weighting parameters in the set correspond to different weighting methods, and only one weighting parameter is derived for each of the different weighting methods.

10. The method of claim 9, wherein the rate distortion optimization is performed using Lagrangian multipliers.

11. The method of claim 9, wherein said encoding step selects the single weighting parameter based upon a computation of a distortion metric.

12. The method of claim 11, wherein the distortion metric is computed as an absolute picture difference between the single prediction picture and a weighted reference picture.

13. The method of claim 11, wherein the distortion metric is computed as a difference between histograms of the single prediction picture and a weighted reference picture.

14. The method of claim 11, wherein said encoding step uses at least one of histogram methods, picture mean averages, linear regression, displaced differences, and iterative methods to estimate explicit weighting parameters for the single prediction picture.

15. The method of claim 9, wherein said encoding step also selects an optimal weighting method from among the different weighting methods to encode the single prediction picture based on distortion characterization, the optimal weighting method selected from among a non-weighted prediction method, an explicit weighted prediction method, and an implicit weighted prediction method, each included in the set of weighting parameters, and wherein the single weighting parameter is explicitly coded in a resultant bitstream in the explicit weighted prediction method and is implicitly derivable from the resultant bitstream in the implicit weighted prediction method.

16. The method of claim 15, wherein said encoding step selects the optimal weighting method to encode the single prediction picture using at least one transition detection method.

17. The apparatus of claim 7, wherein different priorities are respectively assigned to the different weighting methods.

18. The apparatus of claim 17, wherein at least some of the different priorities are altered depending upon whether a transition detection method is unused to select the at least one weighting parameter.

19. The apparatus of claim 18, wherein the at least some of the different priorities that are altered depending upon whether the transition detection method is unused to select the at least one weighting parameter comprise the non-weighted prediction method and the implicit weighted prediction method.

20. The method of claim 15, wherein different priorities are respectively assigned to the different weighting methods.

21. The method of claim 20, wherein at least some of the different priorities are altered depending upon whether a transition detection method is unused to select the at least one weighting parameter.

22. The method of claim 21, wherein the at least some of the different priorities that are altered depending upon whether the transition detection method is unused to select the at least one weighting parameter comprise the non-weighted prediction method and the implicit weighted prediction method.

* * * * *